May 31, 1938.  E. S. CORNELL, JR  2,118,809
CONTROL MEANS FOR AIR ACTUATED MOTORS
Filed March 25, 1933  2 Sheets-Sheet 1
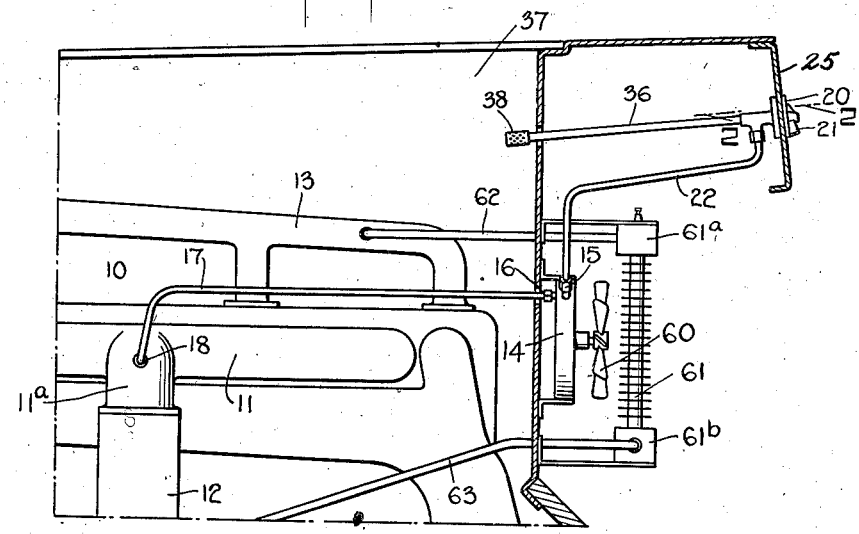
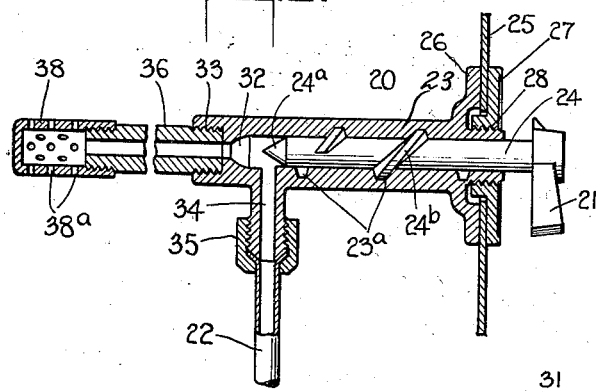
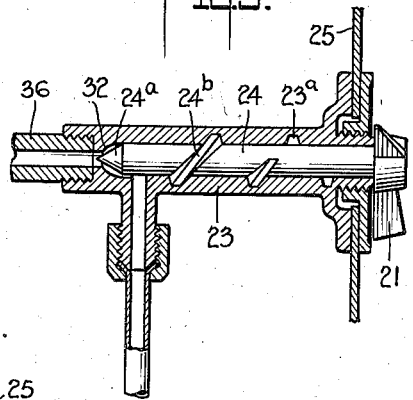
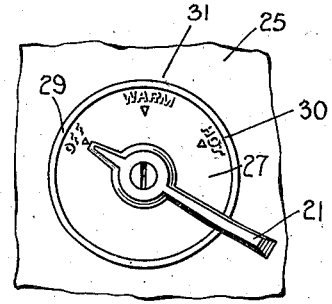
INVENTOR.
EDWARD S. CORNELL, JR.
BY
HIS ATTORNEY May 31, 1938.    E. S. CORNELL, JR    2,118,809
CONTROL MEANS FOR AIR ACTUATED MOTORS
Filed March 25, 1933    2 Sheets-Sheet 2
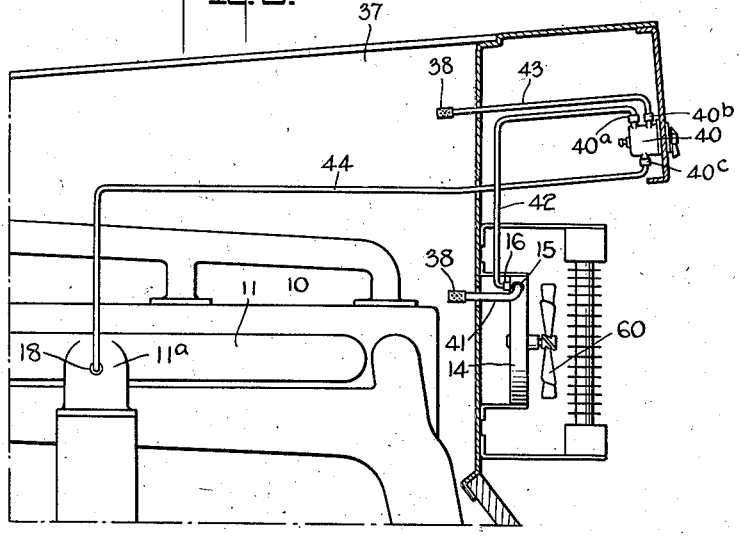
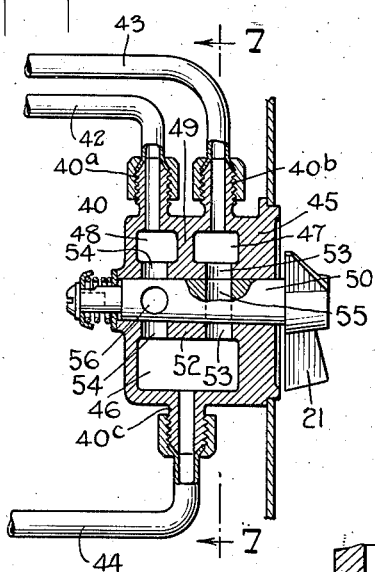
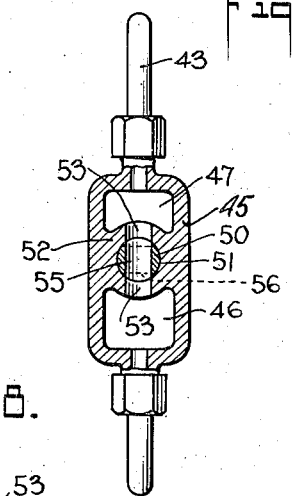
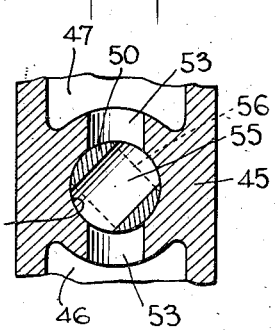
INVENTOR,
EDWARD S. CORNELL, JR.
HIS ATTORNEY Patented May 31, 1938

2,118,809

UNITED STATES PATENT OFFICE 2,118,809

CONTROL MEANS FOR AIR ACTUATED MOTORS

Edward S. Cornell, Jr., Larchmont, N. Y., assignor to American Radiator Company, New York, N. Y., a corporation of New Jersey Application March 25, 1933, Serial No. 662,722

3 Claims. (Cl. 60—60)

This invention relates to control means for air actuated motors.

In my copending application Serial No. 606,878 entitled Auto heating system, filed April 22nd, 1932, now Patent No. 2,081,696, granted May 25, 1937, I set forth the assembly of a suitable heating unit such as a set of coils supplied with heated water diverted under control from the cooling system of the tractive motor of an automobile, an air motor actuated under pressure differential, such as the pressure differential induced in the intake manifold of the tractive motor, a fan actuated by the air motor for projecting air in heat exchange relation with the heating unit, and a manually operated control valve for regulating the pressure differential effective upon the air motor, to thereby control the effective heat supplied to the interior of the automobile. In my aforesaid copending application, inter alia, I disclose the control valve as connected by suitable piping means between the intake manifold of the tractive motor and the discharge of the air motor, the intake of the air motor communicating with the atmosphere in suitable manner, either with the interior of the automobile or with the interior of the hood compartment.

In my aforesaid copending application, I also disclose the disposition of the control valve in the intake connection of the air motor, that is to say, between the atmosphere and the intake of the air motor.

In such various assemblies, the setting of the movable element of the control valve regulates the effective air flow between the intake and the discharge of the air motor, operative upon the rotor of the air motor, whereby the rotor is varied in speed and thereby varying the speed of rotation of the fan and therewith the rate of projection of the air in heat exchange relation with the coils or other heating element of the heating unit.

The invention of my present application generally is the assembly of a suitable control valve with the above or other approved appurtenant parts for regulating the operation of the air motor under pressure differential induced in the intake manifold or otherwise by the tractive motor, such pressure differential being subject to variation incidental to the normal operation of varied drive of the automobile including idling of the tractive motor.

More particularly, the present invention is directed to the provision through the intermediation of the control means of air flow into the intake manifold or equivalent of the tractive motor during the stage of non-operation of the air motor, for purposes of simplicity of the setting of the carburetor and efficiency of action of the resultant gasoline-air emulsion fluid.

Further features and objects of the invention will be more fully understood from the following detail description and the accompanying drawings, in which—

Fig. 1 is a side elevation of an assembly embodying my invention applicable to the heating of the interior of an automobile, the control valve being illustrated as disposed in the intake line of the air motor. Fig. 2 is a central vertical section on line 2—2 of Fig. 1, on an enlarged scale; the movable valve member in this figure is shown in a full open position. Fig. 3 is a side elevation of Fig. 2, the movable valve being shown in its full "stop" position. Fig. 4 is a front elevation of Fig. 3 showing the indicator and handle of the movable valve.

Fig. 5 is a side elevation of an assembly illustrating another embodiment of my invention, both in detail construction of the control valve and the manner of interconnection of the same relative to the remaining parts of the assembly; the invention is also illustrated in connection with the heating of an automobile. Fig. 6 is a vertical sectional elevation of the control valve shown in Fig. 5, on an enlarged scale. Fig. 7 is a detail sectional elevation on line 7—7 of Fig. 6. Fig. 8 is a detail sectional elevation corresponding to Fig. 7, but showing the movable valve member in another position.

Referring to the assembly and parts thereof illustrated in Figs. 1, 2, 3 and 4, in a system for effecting the heating of the interior of the automobile, 10 designates the tractive motor, of the explosive type, the intake manifold of which is indicated at 11, its carburetor at 12; 13 indicates a passage of the water cooling system of the tractive motor.

The air motor is indicated at 14 and may be of any suitable construction. An advantageous construction is disclosed in my copending application, Serial No. 623,697, filed July 21st, 1932, entitled Air motor, now U. S. Patent No. 1,926,528, granted September 12, 1933. The intake of the air motor is designated at 15 and its discharge at 16. In general, the air motor comprises a rotor or other movable part displaced under differential pressure between its intake 15 and its discharge 16 effected by corresponding air flow.

In the embodiment illustrated in Fig. 1, the differential pressure is illustrated as induced by the intake manifold or other appurtenant part, effective in the normal operation of an explosive type of engine; to attain such purpose the discharge 16 of the air motor 14 is connected by the piping 17 to a bushing 18 tapped in the riser 11a of the intake manifold 11.

In carrying out certain phases of my invention the air motor may be employed for operating a fan or equivalent for effecting general projection or circulation of the air irrespective of heat exchange relation with the heater unit; such arrangement functions to project or circulate the air within the interior of the automobile while affording the windshield and other windows of the automobile to remain closed.

The operation of the air motor 14 as illustrated in Fig. 1, is controlled by the control means shown in Fig. 1 in the form of a valve 20, equipped with a manual setting member 21; the control means is shown connected by piping 22 with the intake 15 of the air motor 14.

As is illustrated in Figs. 2, 3 and 4, the control means 20 may be of the valve type, comprising a hollow body 23 into which is received the movable valve member 24 to whose outer end the manual setting 21 is directly or otherwise secured. The valve body 23 is advantageously constructed for removable securement to an instrument board 25 or other plate or other suitable element carried by or secured to an appropriate portion of the body of the automobile; for such purpose, the valve body 23 is provided with an enlarged or flanged projecting portion 26 adapted to engage the inner face of the plate 25, and an outer plate 27 also of enlarged diameter secured by screw threaded connection, see 28, or other adjustable clamping means.

The movable valve 24 is preferably mounted within the hollow valve body 23 to displace its valve end portion 24a from "off" to "hot", or equivalent, by turning movement of the setting member 21 less than a full circumference. To attain such relationship the movable valve member 24 is provided with a suitable worm threading 24b mating with the corresponding threaded groove 23a.

Fig. 4 illustrates the outer plate 27 bearing suitable notations indicative of operative positions of the manual setting device 21, viz., "off" at 29, "hot" at 30, and "warm" at 31. Any other form of notations may be employed, and any other suitable manner of operation of the movable valve 24 and its setting arm 21 may be employed.

The valve seat of the hollow valve 23 is indicated at 32; the intake opening of the valve body is indicated at 33. The discharge opening 34 of the valve body is connected to the end of the piping 22 by any suitable means, as by a flared compression joint 35. The intake 33 may communicate directly with the atmosphere of the interior of the automobile body, or may be connected by piping 36 to communicate with the interior of the hood compartment 37. Whether connected directly with the atmosphere or indirectly through piping 36, an air filter 38 may be employed. The air filter is illustrated as of suitable hollow construction provided with intake perforations 38a.

In Fig. 2, the movable valve member 24 is shown in substantially full position, corresponding to "hot" position, in which position substantially full flow of air and full operation of the air motor and appurtenant parts ensues, namely, by air flow through the valve intake 33, thence through its discharge 34, piping 22, air-motor intake 15, into and through the interior of the air-motor casing, thereby actuating its rotor and rotor shaft, thence through the air-motor discharge 16, piping 17 into the tractive motor intake manifold 11.

Upon turning the movable valve member 24 from its "hot" position toward its "off" position, compare Figs. 2 and 3, its valve end 24a serves to graduately more and more restrict the rate of air flow, as for example, at its indicated "warm" position, and ultimately to its effective closing position, i. e., corresponding to "off".

Preferably, in the actuation of the air motor under sub-atmospheric pressure differential induced in the intake manifold of an explosive engine, "bleed" of air is provided for all positions of the control means, and the carburetor, including its priming device, of the tractive motor properly adjusted for the inflow of air into the manifold.

To meet such condition, see Fig. 3, the effective face of the valve seat 32 is related to the movable valve end 24a to provide a preferably predetermined leakage of air therebetween at "off" position, the extent of such air "bleed" being practically insufficient to operate the air motor.

As indicated in Figs. 2 and 3, the movable valve member 24 is limited in displacement toward its "off" position by engagement of the head of its manual setting member 21 with the valve housing plate 25; such "bleed" relation may as also indicated in Figs. 2 and 3, be had by non-coincident contour and dimensions, i. e., concave arcuate contour for the valve seat 32 and conical contour and lesser dimensions of the valve end 24a, and/or by an inner stop effected by discontinuance of the thread groove 23a, for positively limiting the inward movement of the movable valve member 24.

In the embodiment, shown in side elevation in Fig. 5, the control means 40 is disposed intermediate the source of pressure differential and the air motor. Preferably, and as is indicated generally in Fig. 5 and in detail in Figs. 6, 7, and 8, the control means provides for air flow through the piping for all positions of control of the control means, the effective air flow through the air motor being regulated for the positions of its setting from "off" to "hot".

The parts illustrated in Fig. 5 comprise the intake 15 of the air motor 14 communicating with the atmosphere, either directly, that is to say, with the interior of the automobile body, or as shown, through the piping 41 with the interior 37 of the hood compartment, and preferably with a strainer 38. The discharge 16 of the air motor is connected by piping 42 with the intake 40a of the control means 40; the intake 40b of the control means communicates either directly with the atmosphere, that is, with the interior of the automobile body, or as shown, by piping 43 leading to the interior of the hood compartment 37, preferably through a strainer 38.

The actuation of the air motor 14, under control of the control means 40 is shown effected by connection of the piping 44 communicating at its one end through the bushing 18 with the interior of the riser 11a of the intake manifold 11 of the tractive motor 10 and its opposite end through the discharge nipple 40c with the interior of the control means 40.

In general, and as illustrated in Figs. 6, 7 and 8, the control means comprises a hollow body 45, the lower interior portion 46, provided with a discharge nipple 40c; the upper interior of the hollow body 45 comprises two portions 47, 48, separated by a vertical septum 49; the interior portion 47 is provided with an inlet nipple 40b, and the interior portion 48 is provided with an inlet nipple 40a.

The movable valve member 50 is shown rotatively mounted within the cylindrical opening 51 of the septum 52, dividing the respective upper interior portions 47 and 48 from the lower interior portion 46, the septum however being provided with oppositely disposed and respectively aligned ports 53, 53, and 54, 54. The movable valve member 50 is provided with a perforation 55 adapted for certain range of positions of the movable valve member 50 to communicate to more or less degree with the respective ports 53, 53, and is further provided with a perforation 56, disposed angularly, and as is illustrated in Fig. 6 at right angles, to the direction of length of the perforation 55, for similar cooperation with the ports 54, 54.

Accordingly, in the position of the movable valve member 50, as is illustrated in Fig. 6, namely, full registration of perforation 55 with the ports 53, 53, pressure differential induced in the piping 44 is effective wholly and solely through the piping 43. This position of the manual setting member 21 of the movable valve member 50 shown in Figs. 6 and 7, corresponds to its "off" position, whereby the differential pressure induced through the piping 44 effects a "bleed" of the air through the control means without operation of the motor.

Upon turning the movable valve member by its manual setting member 21 from its "off" position shown in Figs. 6 and 7, the extent of communication of the ports 53, 53 through the perforation 55 is restricted, see Fig. 8, to greater and greater degree and communication effected to greater and greater degree between the ports 54, 54, through the perforation 56, thus gradually decreasing the air flow through the piping 43 and gradually increasing the air flow through the piping 44. Continued turning of the manual setting member to "hot" effects full registration of the perforation 56 with the ports 54, 54, at which stage full actuation of the air motor ensues and the air inflow through the nipple 40b is nil.

In such most preferred embodiments of my invention, the assembly of the movable valve member 50 having the perforations 55, 56 or other channels of communication, and the associated ports 53, 53 and 54, 54 may be arranged and dimensioned to provide for substantially uniform air flow into the air intake manifold of the tractive motor throughout the range of operation of the air motor, inclusive of its stage of non-operation.

From the above, it appears that my invention provides for the assembly with a suitable source of differential pressure and an air-motor, of control means for regulating the effective air flow through the air-motor and therewith the degree or extent of actuation of the air motor.

The provision of an air "bleed" is particularly applicable to differential pressure effective within the intake manifold of an explosive engine, or otherwise responsive to the rate of operation of the tractive motor, and subject to variations in pressure arising from varied rate of operation in the normal drive of the vehicle, whereby corresponding variations of pressure differential are effective upon the rotor or other displaced member of the air-motor.

My assembly of air-motor and control device is particularly useful for the actuation of a fan 60, see Figs. 1 and 5, or equivalent, serving generally to project the air either in heat exchange relation with a heater unit or for air circulating purposes, or both. Advantageously, the heater unit, as indicated in Fig. 1, may be of the so-called hot water type, and may comprise a set of coil elements interconnected at top and bottom by suitable headers, see 61a, 61b, which may be respectively connected by the hose or other piping 62, 63, with suitable passages of the water cooling system of the tractive motor 10. However, the heater unit may be heated by any other suitable medium, or other suitable mode of supply of heating medium may be employed.

Whereas I have described my invention by reference to specific forms thereof, it will be understood that many changes and modifications may be made without departing from the spirit of the invention.

I claim:

1. In combination with an automotive vehicle having an internal combustion engine provided with a carburetor and an intake manifold leading from the carburetor to the combustion chamber or chambers of the internal combustion engine, of a variable speed air motor provided with intake and outlet ports, tubing connecting the out-take of said air motor with said intake manifold of the internal combustion engine, and valve means associated with said air motor for regulating the speed of said air motor, said valve means including means for effecting flow of air through said valve means into said intake manifold at all stages of operation of said air motor including the stage of full operation of the air motor and means for limiting the movement of the movable element of said valve means at the stage of non-operation of said air motor to afford flow of air through said tubing.

2. In combination with an automotive vehicle having an internal combustion engine provided with a carburetor and an intake manifold leading from the carburetor to the combustion chamber or chambers of the internal combustion engine, of a variable speed air motor provided with intake and outlet ports, tubing connecting the out-take of said air motor with said intake manifold of the internal combustion engine, and valve means associated with said air motor for regulating the speed of said air motor, said valve means including means for effecting substantially uniform flow of air through said valve means into said intake manifold at all stages of operation of said air motor including the stage of full operation of the air motor and means for limiting the movement of the movable element of said valve means at the stage of non-operation of said air motor to afford flow of air through said tubing.

3. In combination with an automotive vehicle having an internal combustion engine provided with a carburetor and an intake manifold leading from the carburetor to the combustion chamber or chambers of the internal combustion engine, of a variable speed air motor provided with intake and outlet ports, tubing connecting the out-take of said air motor with said intake manifold of the internal combustion engine, and valve means associated with said air motor for regulating the speed of said air motor, said valve means including means for effecting flow of air through said valve means into said intake manifold at all stages of operation of said air motor including the stage of full operation of the air motor and means for limiting the movement of the movable element of said valve means at the stage of non-operation of said air motor to afford flow of air through said tubing, said valve means being disposed between said out-take of said air motor and said inlet manifold.

EDWARD S. CORNELL, Jr.